T. GARE.
APPARATUS FOR THE MANUFACTURE OF STABBED SHEET METAL.
APPLICATION FILED JUNE 24, 1919.

1,313,809.

Patented Aug. 19, 1919.

Inventor
Thomas Gare
Per Marcow Fenwick & Lawrence,
Attorneys

T. GARE.
APPARATUS FOR THE MANUFACTURE OF STABBED SHEET METAL.
APPLICATION FILED JUNE 24, 1919.
1,313,809.
Patented Aug. 19, 1919.
2 SHEETS—SHEET 2.
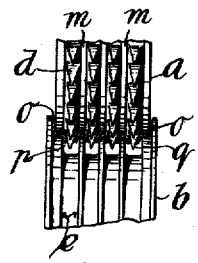
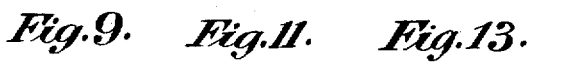
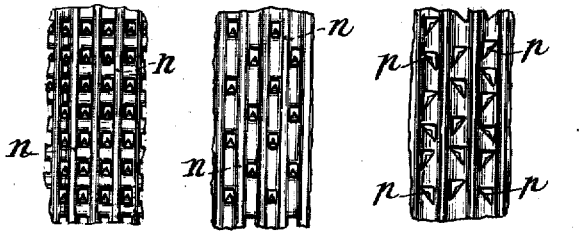
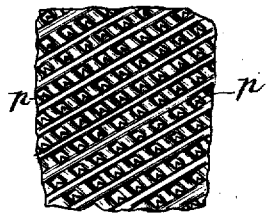
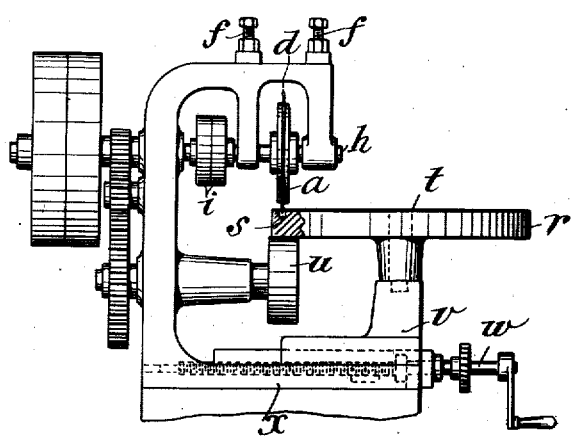
Inventor.
Thomas Gare.
Per Haseu Fenwick & Lawrence,
Attorneys

UNITED STATES PATENT OFFICE.

THOMAS GARE, OF SUDBURY, ENGLAND.

APPARATUS FOR THE MANUFACTURE OF STABBED SHEET METAL.

1,313,809.  Specification of Letters Patent.  Patented Aug. 19, 1919.

Application filed June 24, 1919. Serial No. 306,478.

*To all whom it may concern:*

Be it known that I, THOMAS GARE, a subject of the King of Great Britain, residing at Sudbury, in the county of Middlesex, England, have invented certain useful Improvements in Apparatus for the Manufacture of Stabbed Sheet Metal, of which the following is a specification.

This invention relates to improvements in apparatus for the manufacture of stabbed sheet metal, the holes of which have on one side burs and which sheet metal is for instance used for grinding and grating purposes.

Hitherto said apparatus generally comprised two metal plates, one provided with pointed cylindrical punches and the other with holes in register with said punches, the sheet metal being placed upon the latter plate and pierced by said punches of the other plate on pressure being exerted on the latter.

The object of this invention is to provide means whereby stabbed sheet metal can be produced at a much quicker and thus cheaper rate and of greater efficiency, strength and durability than hitherto has been the case and whereby pieces of stabbed sheet metal may be produced with straight, circular and spiral rows of holes and burs or projections and of band shape.

The invention consists chiefly in the combination of two rotary members arranged in the operative connection with each other, one of which members is peripherally formed with annular or spiral grooves and the other with annular or spiral rows of spikes or teeth to register with the said annular or spiral grooves, the said spiked or toothed member serving as a rotary punch or shear and the said annularly or spirally grooved member as a support or die for the sheet metal to be stabbed.

I attain this object by the means illustrated in the accompanying drawings, in which—

Figure 1:
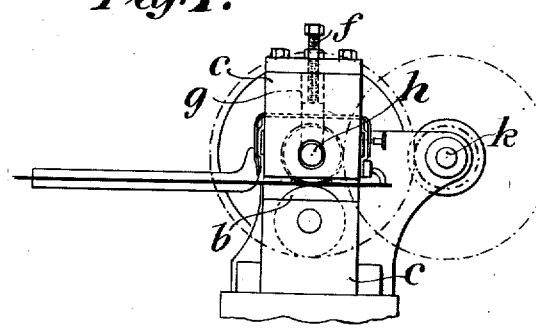
Figure 3:
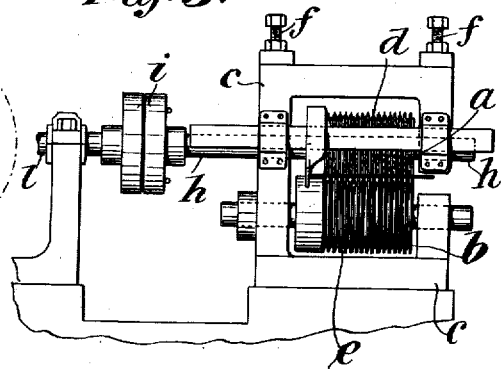
Figure 2:
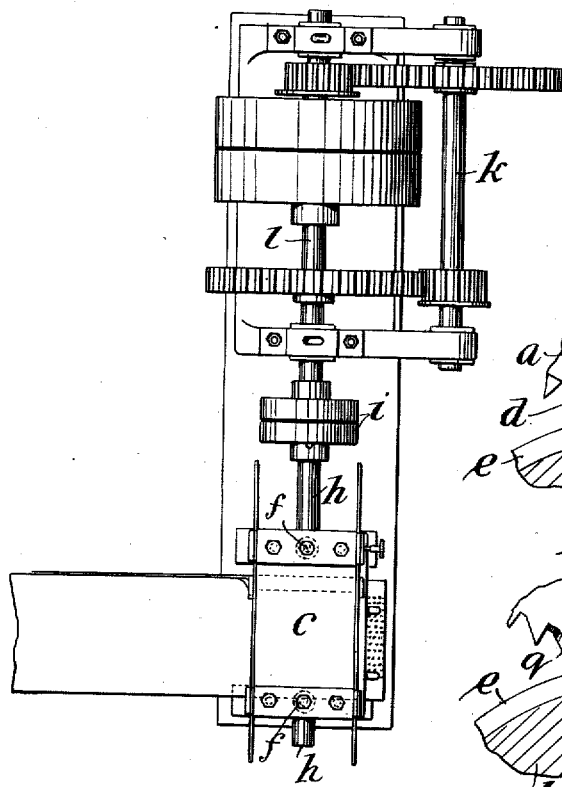

Figure 1 is an end view. Fig. 2 a plan. Fig. 3 a side elevation of a machine for stabbing sheet metal with straight rows of holes. Figs. 4, 6 and 5, 7 and 8, show respectively, on an enlarged scale, detached sectional end views and side views of various forms of rollers used. Figs. 9, 11 and 10, 12 and 13, 14 and 15, show respectively also on an enlarged scale, cross sections and plans of the stabbed sheet metal produced. Fig. 16, is a side view of a machine for stabbing sheet metal with circular or spiral rows of holes.

Referring to Figs. 1, 2 and 3, according to one embodiment of this invention, $a$, $b$ are the said two rotary members which are in the form of rollers suitably mounted in a frame $c$ and may be geared together, the former being provided with annular rows of spikes or teeth $d$ and the latter with annular grooves $e$. One of the said rollers, say $a$, is suitably driven and rendered adjustable in relation to the other roller $b$ to permit of varying the depth of the stab, as may be required.

In the present instance, the roller $a$ is rendered adjustable at each end by means of a set screw $f$ turnably mounted in the ends of the frame $c$ and set against blocks $g$ located therein and bearing on the ends of the shaft $h$.

By means of a coupling $i$, the roller shaft $h$ is connected with a driving gear, say comprising two shafts $k$, $l$ suitably geared together and a pulley on the latter.

Figure 5:
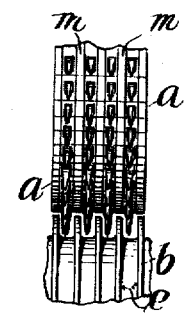

The rollers $a$ and $b$ may be of any suitable width or length according to the width or size of sheet metal to be stabbed and may be formed in one solid piece or built up in sections with distance pieces $m$ between them, as shown in Figs. 3 and 5.

When building up the said rollers in sections, the distance between the annular rows of spikes or teeth $d$ may not only be altered at will, but instead of being in line with each other, they may be relatively displaced so as to form stabs in the sheet metal which are disposed as shown in Figs. 11 and 12, which displacement not only strengthens the stabbed sheet metal, but in the grinding or grating, also prevents the material accumulating between the stabs, thus providing always a clean and ventilated grating or grinding surface which prevents the material grated or ground from being burnt.

When forming the rollers $a$ and $b$ each in one solid piece, the respective rows of spikes or teeth and grooves are formed spirally in opposite directions to produce sheet metal in which the burs or teeth are disposed in diagonal instead of straight line as shown in Fig. 15, and thus when the sheet metal is circularly bent are caused to operate on the work in continuously changing positions which greatly improves the grating or grinding.

The grooves $e$ in the roller $b$ have also the effect of producing in the sheet metal, channel like depressions $n$ between the rows of stabs see Figs. 9, 10, 11 and 12, which further strengthens the metal, provides longer burs or projections, increases ventilation and prevents friction on the grated or ground material.

In lieu of producing rectangular pieces of stabbed sheet metal of a width and length to fit a cylinder for grinding, stabbed sheet metal may be produced by the said means in band fashion, to allow of being coiled around the said cylinder.

In this case the rollers $a$ and $b$, are made of a width equal to the width of the band to be produced, as shown in Fig. 8, and one side or both sides thereof may be bent to form a flange or flanges $o$ adapted to engage in a correspondingly pitched groove or grooves formed in the periphery of said cylinder and thereby prevent the band from displacing laterally.

Figure 4:
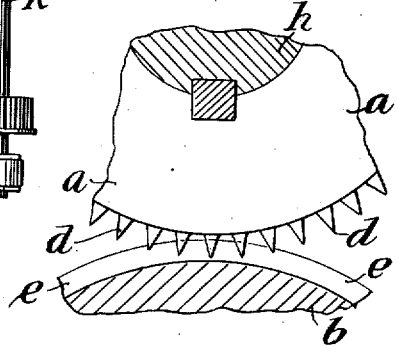
Figure 6:
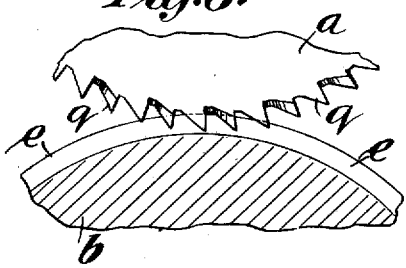
Figure 7:
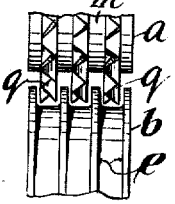

The roller $a$, may be formed with spikes, the points of which are central with the root, as shown in Figs. 4, 5 to produce a triangular bur $p$ as shown in Figs. 9, 10, 11 and 12, or with saw-set teeth $q$ with points located alternately at opposite sides as shown in Figs. 6 and 7 and to produce saw-like burs $p$ as shown in Figs. 13 and 14.

According to another embodiment of this invention Fig. 16, the said two rotary members may consist of a roller $a$ having peripheral spikes or teeth as described, and of a rotating table $r$ having annular or spiral grooves $s$ adapted to be brought into register with the row of spikes or teeth $d$ of the roller $a$.

The said rotating table carries the sheet metal blank $t$ to be stabbed, and is pivotally mounted to an arm or bracket and supported by a pulley $u$ located below the said table in a line with the spiked or toothed roller $d$.

The arm or bracket $v$ is rendered intermittently or gradually movable toward the roller $a$ say by means of a screw threaded spindle $w$ mounted in the frame $x$ of the apparatus, which spindle permits of feeding the table $r$ and sheet metal blank $t$ underneath the spiked or toothed roller $a$ and producing in the said blank either annular or spiral rows of stabs.

I claim:

1. An apparatus for the manufacture of stabbed sheet metal having teeth of sharp-point character for grinding and grating purposes, said apparatus comprising a pair of rotary members mounted in opposition, one of said members having closely arranged and acutely pointed teeth, and the other member being channeled to receive the teeth of the said member and the struck out points of the metal as the latter is passed between the members, the toothed member including a cylindrical organization of relatively circumferentially adjustable sections having the said teeth, and lateral spacing means between the sections, whereby the teeth can be set in groups at the desired displaced relation to each other, or in alinement parallel to the axis of the cylinder.

2. An apparatus for the manufacture of stabbed sheet metal with sharp teeth, comprising two rotary members mounted in a frame in operative connection with each other, one of said members having peripheral gangs of teeth for piercing the sheet metal fed between said members and the other having grooves in register with said teeth, one of the rotary members having flanges to turn up the edges of the sheet.

3. An apparatus for the manufacture of stabbed sheet metal having teeth of sharp-point character for grinding and grating purposes, said apparatus comprising a pair of rotary members mounted in opposition, one of said members having closely arranged and acutely pointed teeth, and the other member being channeled to receive the teeth of the said member and the struck out points of the metal as the latter is passed between the members, the toothed member including a cylindrical organization of relatively circumferential adjustable sections having the said teeth, and lateral spacing means between the sections, whereby the teeth can be set in groups at the desired displaced relation to each other, or in alinement parallel to the axis of the cylinder, the said spacing means providing for lateral spacing of the groups of teeth to provide for the desired spacing of the rows of teeth struck up or produced on the metal being operated upon.

Signed at Manchester, England, this 4th day of June, 1918.

THOMAS GARE.

Witnesses:
  MARY T. BOSSHARDT,
  FERDINAND B. BOSSHARDT.